United States Patent [19]

Guarini

[11] Patent Number: 4,782,598
[45] Date of Patent: Nov. 8, 1988

[54] ACTIVE ERROR COMPENSATION IN A COORDINATE MEASURING MACHINE

[75] Inventor: Antonio Guarini, Bellville, Mich.

[73] Assignee: Digital Electronic Automation, Inc., Livonia, Mich.

[21] Appl. No.: 9,481

[22] Filed: Jan. 30, 1987

Related U.S. Application Data

[63] Continuation of Ser. No. 778,346, Sep. 19, 1985, Pat. No. 4,663,852.

[51] Int. Cl.$^4$ .............................................. G01B 7/00
[52] U.S. Cl. ...................................... 33/503; 33/1 M
[58] Field of Search ................ 33/503, 504, 505, 551, 33/1 M, 1 N

[56] References Cited

U.S. PATENT DOCUMENTS 4,276,698 7/1981 Dore et al. ...................... 33/1 M X
4,333,238 6/1982 McMurtry ........................ 33/503 X
4,597,182 7/1986 Rinn ................................. 33/1 M Primary Examiner—Harry N. Haroian
Attorney, Agent, or Firm—Darby & Darby

[57] ABSTRACT

An error compensated, coordinate measuring machine includes a ram, a supporting structure for the ram and a base on which an object or part to be inspected is secured. The ram is mounted to the structure and movable with respect thereto. An object sensing probe is mounted to the ram. The probe is responsive to contact with the part or object being tested. Sensors are mounted to the ram and the base. The sensor on the ram detects the angular deviation of the ram from a reference plane, and the sensor on the base detects the angular deviation of the base from the same reference plane. A calculator unit determines the difference between the angular deviations of the ram and the base from the reference plane. The machine further includes transducers which measure the position of the ram with respect to the supporting structure, and the position of the supporting structure with respect to the base. The transducers provide ram positional data. A compensating unit adjusts the ram positional data proportionally to the difference between the angular deviations of the ram and the base.

9 Claims, 12 Drawing Sheets

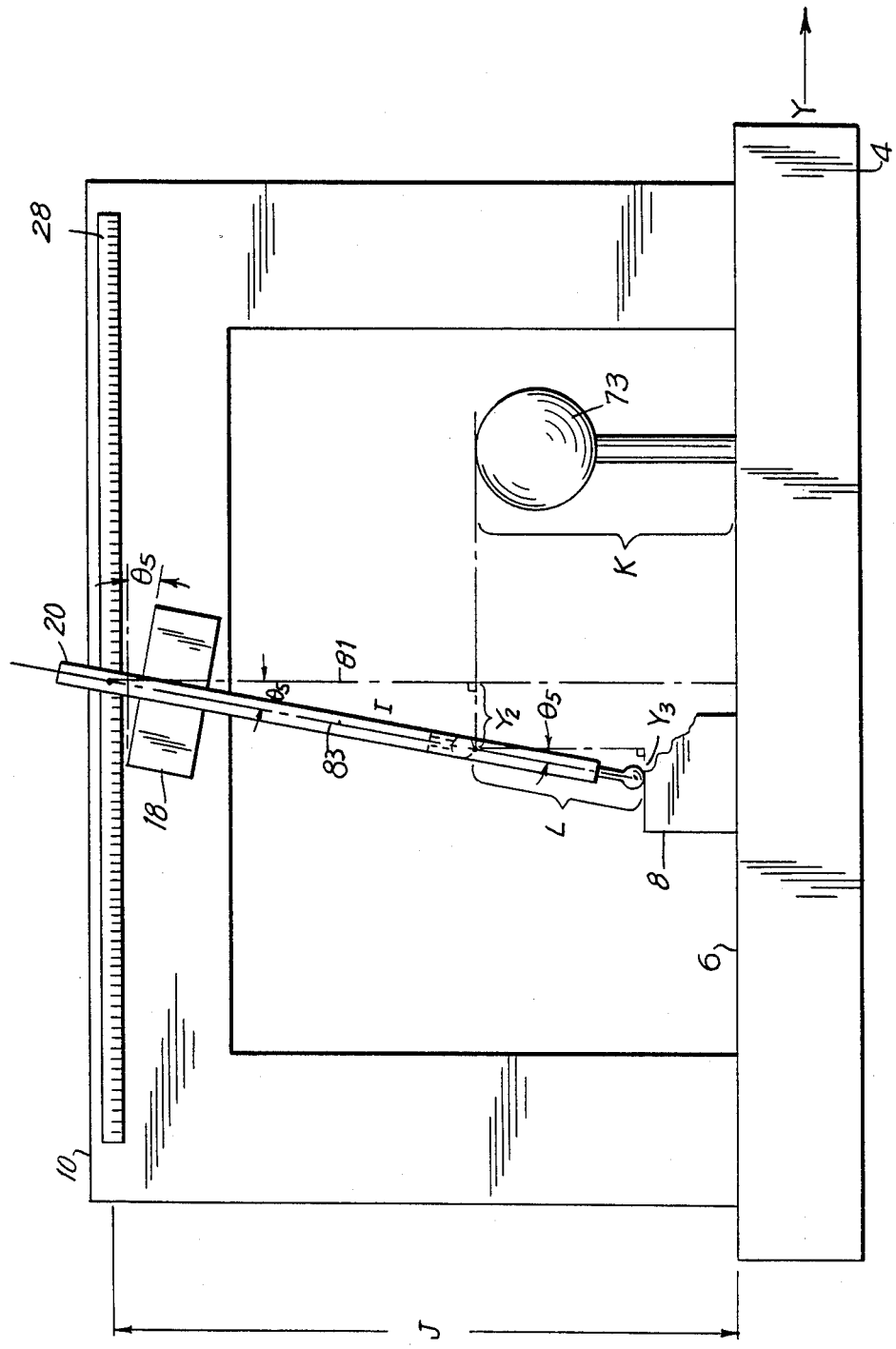

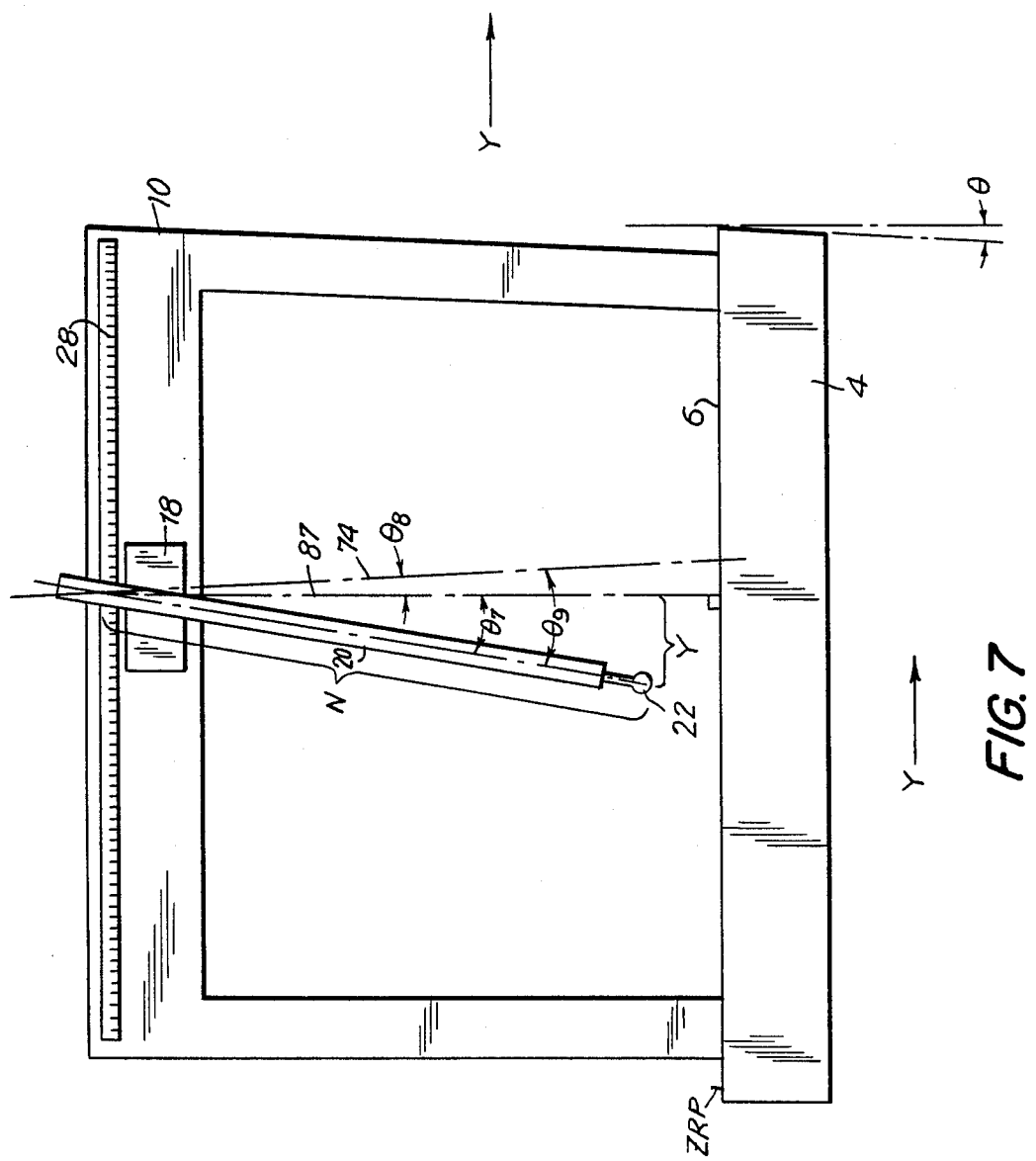

ACTIVE ERROR COMPENSATION IN A COORDINATE MEASURING MACHINE

This is a continuation of application Ser. No. 778,346, filed Sept. 19, 1985, now U.S. Pat. No. 4,663,852.

BACKGROUND OF THE INVENTION

1. Field of the Invention

This invention relates generally to coordinate measuring machines, and more particularly to the active error compensation of such machines.

A coordinate measuring machine is a device that can accurately perform three dimensional measurements of very complex parts. The machine basically probes a test part and determines its spatial coordinates. Among the many uses of the machine, the measurements which it takes will allow the manufacture of a duplicate part.

Several types of coordinate measuring machines exist. One type is a bridge machine. The bridge machine includes a rigid base and a bridge-like structure that is supported by and travels on the base. The base includes a flat surface which holds the test part. Suspended from the bridge structure is an elongated member called a ram. The ram can move vertically on and horizontally across the width of the bridge structure. At the end of the ram is a probe. The probe senses when contact has been made with the part. The probe is positionable in different attitudes so that it has access to each exposed side of the part.

The machine operates by moving the bridge structure and ram until the probe touches the test part. The probe then signals that contact has been made, and the coordinates of the probe's position at contact are recorded. The ram or bridge is then moved an incremental distance and the procedure is repeated until all exposed surfaces of the test part have been measured. A computer in the machine derives the exact dimensions of the test part from the coordinate data.

Another type of coordinate measuring device is a gantry machine. The gantry machine is used for inspecting parts too large to fit on the supporting base of a bridge machine.

The gantry machine includes a rigid structure that is supported by vertical columns. The test part rests below the rigid structure. A ram is suspended from the structure and positionable in all three coordinate planes. The ram includes a probe which detects when contact is made with the test part.

A third type of coordinate measuring machine is the cantilever-type configuration. In this type of machine, a ram supporting beam is supported at only one of its ends over the work area.

2. Description of the Prior Art

Most coordinate measuring machines introduce some errors into their measurements. These errors are due to a number of contributing factors. One factor is the non-linearity in the movement of the ram or its supporting structure. In the bridge type machine, the ram may continually twist and tilt from a given reference plane as it is moved over the working area of the base.

Another factor stems from the fact that all coordinate measuring machines require a ram to locate the part under inspection, and that the position of the part, once detected, is measured at a point remote from the actual part location.

For example, in the bridge type coordinate measuring machine, the ram is suspended above the part from a horizontal cross-member of the bridge structure. This cross-member includes a scale which is used to measure the position of the part in one of the coordinate planes. Basically the position of the part is measured at the intersection of the ram with the scale on the cross-member. However, it is the ram's free end (where the probe is mounted) which actually detects the location of the part. If the ram is tilted when contact with the part is made, the apparent position of the part, measured remotely from where the part is situated, will not be true. This inaccuracy is commonly referred to in the machine tool art as Abbe error, and may occur whenever a measurement scale is located remotely from an object being measured.

The cantilever-type configured machine is even more susceptible to Abbe errors than the bridge type. Because the ram supporting beam is supported at only one end, different weight probes will cause the beam to droop at varying angles, which may contribute to the measurement errors.

Various strategies have been suggested to reduce Abbe errors and other forms of errors that degrade the accuracy of the coordinate measuring machine.

One method is commonly referred to as pre-calibrated error compensation. This process is where the error introduced by the machine is measured once initially, and the error data is used subsequently to alter actual test measurements.

Pre-calibrating the coordinate measuring machine can reduce errors significantly and is useful in many applications. However, the process has a number of drawbacks.

First, calibration is usually done off-line, that is, when the machine is not being used for part inspection. This is because the process is extremely slow, requiring that much calibration data be compiled. Typically, pre-calibration error data is taken in incremental steps that must encompass the entire (commonly, three dimensional) working volume of the coordinate measuring machine.

Second, the calibration measurements must be stored in some medium for future retrieval, which may require a significant allocation of computer memory. Typically, the calibration data is stored in a three dimensional matrix memory. The same data must be selectively retrieved according to the position of the probe in the working area of the machine, and used to calculate the true three dimensional probe location.

Third, non-repeatable errors will not be compensated for. Such errors include vibration from surrounding machinery, and changes to the machine's structural geometry due to temperature, humidity and other environmental effects.

OBJECTS OF THE INVENTION AND SUMMARY OF A PREFERRED EMBODIMENT THEREOF

It is an object of the present invention to provide a method for compensating a coordinate measuring machine or like device during actual part inspection, thereby eliminating the need for a precalibration test.

It is a further object of the present invention to provide a design for a highly accurate, error compensated coordinate measuring machine.

It is yet another object of the present invention to provide an error compensation system for a coordinate measuring machine that will provide accurate and time efficient part inspection with little or no machine down time.

It is a still further object of the present invention to provide a coordinate measuring machine with active error compensation that requires only a limited memory allocated for error compensation, thereby eliminating the need for the mass storage of precalibration data in conventional methods.

It is yet another object of the present invention to provide a coordinate measuring machine that has the capability of immediately compensating for any non-repeatable errors, such as those associated with changes to the geometry of the machine's structure.

An error-compensated coordinate measuring machine in a simplified form includes a supporting surface on which the part to be inspected rests, a ram in the form of an elongated member having a free end, and a supporting structure for the ram. The ram is mounted on its supporting structure at a point remote from its free end, and movable with respect thereto so that it can be positioned adjacent to the object being tested. The ram supporting structure is mounted on the object supporting surface. It is assumed for the purpose of facilitating an understanding of the invention that the ram supporting structure contributes no error or a negligible error to the positional determination of the object under inspection.

An object sensing probe is mounted on the free end of the ram. In one embodiment, the probe is responsive to contact with the part or object being tested.

Angle sensors are mounted on the ram and the object supporting surface. The sensor on the ram detects the angular deviation of the ram from a reference plane, and the sensor on the object supporting surface detects the angular deviation of the object supporting surface from the same reference plane. These sensors may be inclinometers or other suitable devices.

A computer, circuit, calculator or like device is employed for calculating the difference between the angular deviations of the ram and object supporting surface from the reference plane.

A ram position measuring device is used to measure the uncompensated position of the free end of the ram relative to the ram supporting structure. The measuring device may be a scale mounted on one of the ram supporting structure and the ram (along its length) which cooperates with a reference marker, optical sensor or the like mounted on the other of the ram and its supporting structure. The scale is referenced to a zero reference point in the working area of the coordinate measuring machine so that any positional measurements between the ram and its supporting structure can be transposed relative to the zero reference point.

The position measuring devices can determine the apparent position of the ram's free end (on which the object probe is mounted) relative to the preselected zero reference point, and generate data representative of the ram position.

The coordinate measuring machine of the present invention further inclues a device, circuit, computer or the like which adjusts, i.e., compensates, the ram positional data. It receives the positional data from the position measuring devices and compensates that data proportionally to the difference between the angular deviations of the ram and the object supporting surface.

Thus, in accordance with one method of the present invention for accurately compensating the coordinate measuring machine described above, the sensor mounted to the object supporting surface or base will determine the angular deviation or "tilt" of the surface from a reference plane. The sensor mounted to the ram will determine the combination of the tilt of the ram and the object supporting surface, because the ram supporting structure is mounted on that surface and tilts with it.

By calculating the difference between the angular deviations of the ram-mounted and base-mounted sensors, the angular deviation or non-perpendicularity of the ram alone, that is, with respect to the object supporting surface, may be determined.

The apparent position of the ram's free end (with the object probe) with respect to the ram supporting structure is measured. This positional data is adjusted in accordance with the degree of tilt of the ram alone, that is, with respect to the base, as represented by the difference between the angular deviations of the ram and the object supporting surface.

The above-described method and design are quite useful where the ram supporting structure and all of its component parts contribute little to the positional error of the ram. However, the error compensated machine of the present invention may include additional sensors mounted to the supporting structure and its movable component parts to compensate for positional errors contributed by each component part.

These and other embodiments, objects, features and advantages of this invention will be apparent in the following detailed description of illustrative embodiments thereof, which is to be read in connection with the accompanying drawing.

BRIEF DESCRIPTION OF THE DRAWING

FIGS. 6a through 6c are diagrammatic representations of a bridge-type coordinate measuring machine, shown in front view;

FIG. 7 is a diagrammatic representation of a portion of a bridge-type coordinate measuring machine, shown in front view;

DETAILED DESCRIPTION OF THE PREFERRED EMBODIMENT

A preferred embodiment of the present invention will now be described in detail. To facilitate an understanding of the invention, active error-compensation of a bridge-type coordinate measuring machine will be described herein. However, it is envisioned that other types of coordinate measuring machines, for example, the gantry type machine, may be similarly compensated and within the scope of this invention.

Figure 1:
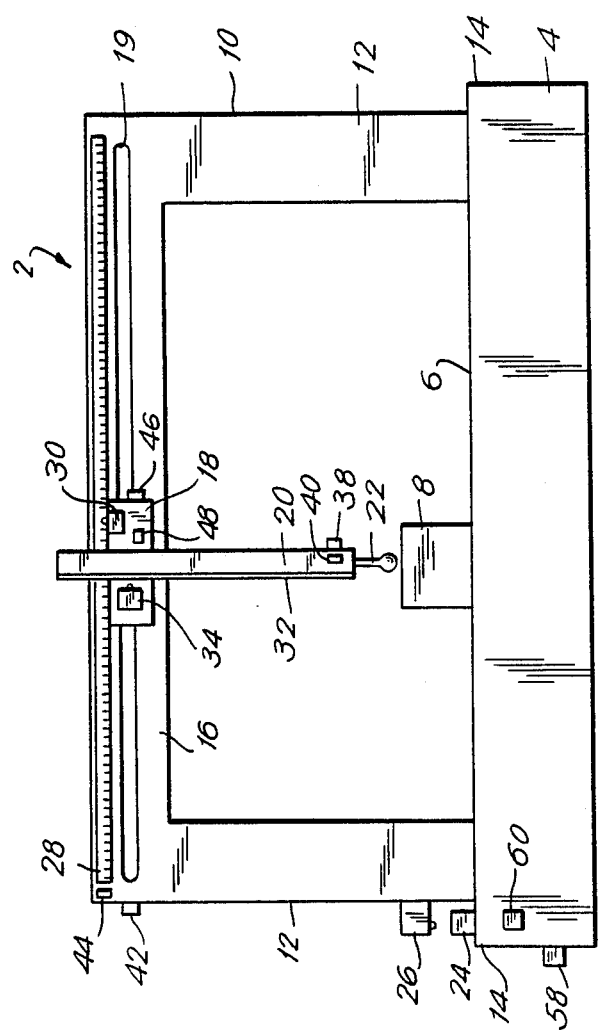
FIG. 1 is a pictorially representative front view of an error-compensated, bridge-type coordinate measuring machine, constructed in accordance with the present invention.
Figure 2:
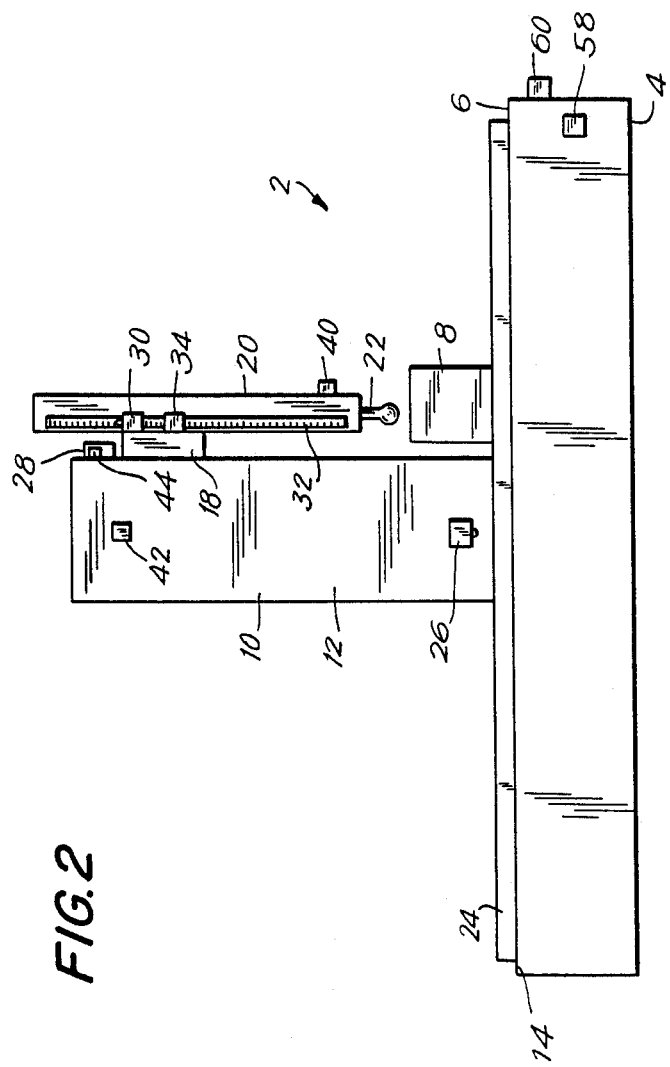
FIG. 2 is a pictorially representative side view of the error-compensated, coordinate measuring machine shown in FIG. 1.

Referring now to FIGS. 1 and 2 of the drawing, it will be seen that a bridge-type coordinate measuring machine 2 includes a highly rigid base 4 made from fine granite or the like, and having a holding surface 6, which may be defined by a surface plate (not shown), on its upper surface on which the object 8 to be inspected rests and is secured to.

A traveling bridge-like structure 10 is mounted to the base above the object-holding surface 6. The traveling bridge 10 moves with respect to the base 4 in at least one coordinate direction, illustrated by FIG. 1 to be in the X coordinate.

More specifically, the traveling bridge structure 10 includes two upright columns 12 near the edges 14 of the base 4, and a horizontal cross-member 16 spanning the two columns 12. Because the traveling bridge 10 moves on the base 4 in the X direction, it is sometimes referred to as the "X carriage."

A carriage 18 rides on a track 19 formed in the horizontal member 16 of the traveling bridge, and is movable in the Y coordinate direction, that is, transverse to the direction which the traveling bridge structure 10 moves on the base 4. This carriage 18 is commonly referred to as the "Y carriage".

Mounted on the Y carriage 18 is an elongated member 20 that is vertically disposed, that is, in the Z direction. This elongated member 20 is commonly referred to as a "ram". The ram 20 is upwardly or downwardly adjustable on the Y carriage 18.

Thus, because the traveling bridge structure 10 is movable in the X direction, the carriage 18 is movable in the Y direction, and the ram 20 is movable in the Z direction, the ram 20 can be positioned anywhere and at any height over the working surface 6 of the base 4. This allows the ram 20 to be positioned adjacent an object 8 secured to the working surface 6 of the base 4 so that the object can be inspected.

In summary, there are basically three movable components of the bridge-type machine—a ram 20, a Y carriage 18 and an X carriage 10—each of which is capable of movement in at least one direction with respect to the base 4.

An electronic probe 22 is mounted to the lower free end of the ram 20. The probe 22 can sense when it makes contact with an object 8 resting on the base of the machine. It generates an electronic signal to which the machine responds when contact is made.

The probe 22 is positionable on the ram 20 in any direction or attitude, including vertically as an extension of the ram 20 in the Z direction, or in any other direction including the horizontal, or X-Y plane. The positionability of the probe 22 allows all sides of the part 8 to be accessed.

Of course, it is envisioned that non-contacting probes may be used with the present invention. These probes include an emitter that is used to scan the object with a collimated light beam, and an optical receiver which senses the reflected light beam from the object. For simplicity, however, an embodiment of the present invention which uses a contacting type probe, such as 22, will be described herein.

The coordinate measuring machine further includes a number of position indicators or transducers. In its simpler form the X position indicator may be a scale mounted on the base which cooperates with a reference mark on the traveling bridge. The scale may be referenced to a zero reference point so that the absolute position of the traveling bridge structure indicated on the scale by the reference mark can be readily determined.

Of course, a more sophisticated position indicator is preferably used rather than the scale and reference mark. In place of a scale, an elongated bar 24 having a number of minute graduations formed along its length is mounted on the base adjacent column 12 of the traveling bridge, and extends in the X direction. In place of a reference mark, an optical reader 26 or other sensing device is positioned on column 12 adjacent the graduated bar 24. The optical reader 26 detects movement of the traveling bridge relative to the base by sensing the number of graduations on the bar 24 which have been passed. The bar 24 is referenced to the zero reference point so that the absolute position of the traveling bridge can be determined. Because the ram 20 is mounted to the traveling bridge/Y carriage structure, the graduated bar 24 and optical reader 26 may be used to determine the apparent (uncompensated) position of the ram 20, or more accurately, the electronic probe 22 mounted at the end of the ram, at any position along the X-axis. The X-axis position indicator thus is adapted to provide ram positional data relating to ram movement in the X-axis to a computer of the coordinate measuring machine 2, which will be described in greater detail.

Likewise, a scale, graduated bar 28 or other form of position indicator is mounted to the traveling bridge 10 along the horizontal cross-member 16 (i.e., in the Y direction). A reference mark or optical reader 30 is provided on the Y carriage 18 adjacent to bar 28. The ram 20 is a known and measurable distance in the Y direction from the position of the reference mark or optical reader 30 on the Y carriage. Also, graduated bar 28 may be referenced to the same zero reference point used to reference the X graduated bar 24. In this way, the apparent position of the ram 20 (or probe 22 which is merely an extension of ram 20) relative to the zero reference point may be determined by bar 28 and reader 30.

A scale, graduated bar 32 or other position indicator is mounted to the ram 20, and extends along at least a portion of the ram's length in the Z direction. A reference mark or optical reader 34 is provided on the Y carriage and positioned adjacent graduated bar 32. The position of the reference mark or optical reader 34 may be referenced to the zero reference point by knowing the height of columns 12 of the traveling bridge 10 and thus the distance of the reference mark or optical reader 34 above the working surface 6 of the machine's base 4. Bar 32 and reader 34 will allow the apparent position of the free end of ram 20 (or probe 22) in the Z direction to be measured. Like the X-axis position indicator, the Y and Z-axes position indicators will provide ram positional data for movement of the ram in the Y and Z directions.

In summary, the apparent position of the ram 20 and the probe 22 relative to a pre-selected zero reference point in the working area of the machine may be determined in all three coordinates by graduated bars 24, 28, 32 and their associated optical readers 26, 30, 34.

The optical sensing devices, such as readers 26, 30 and 34, are preferably selected for their high accuracy. These optical sensing devices will provide positional data to the machine's computer. However, the principles of the present invention disclosed herein apply whether graduated bars and optical readers, mechanical scales and reference marks, lasers, or any other indicators are used.

Figure 3:
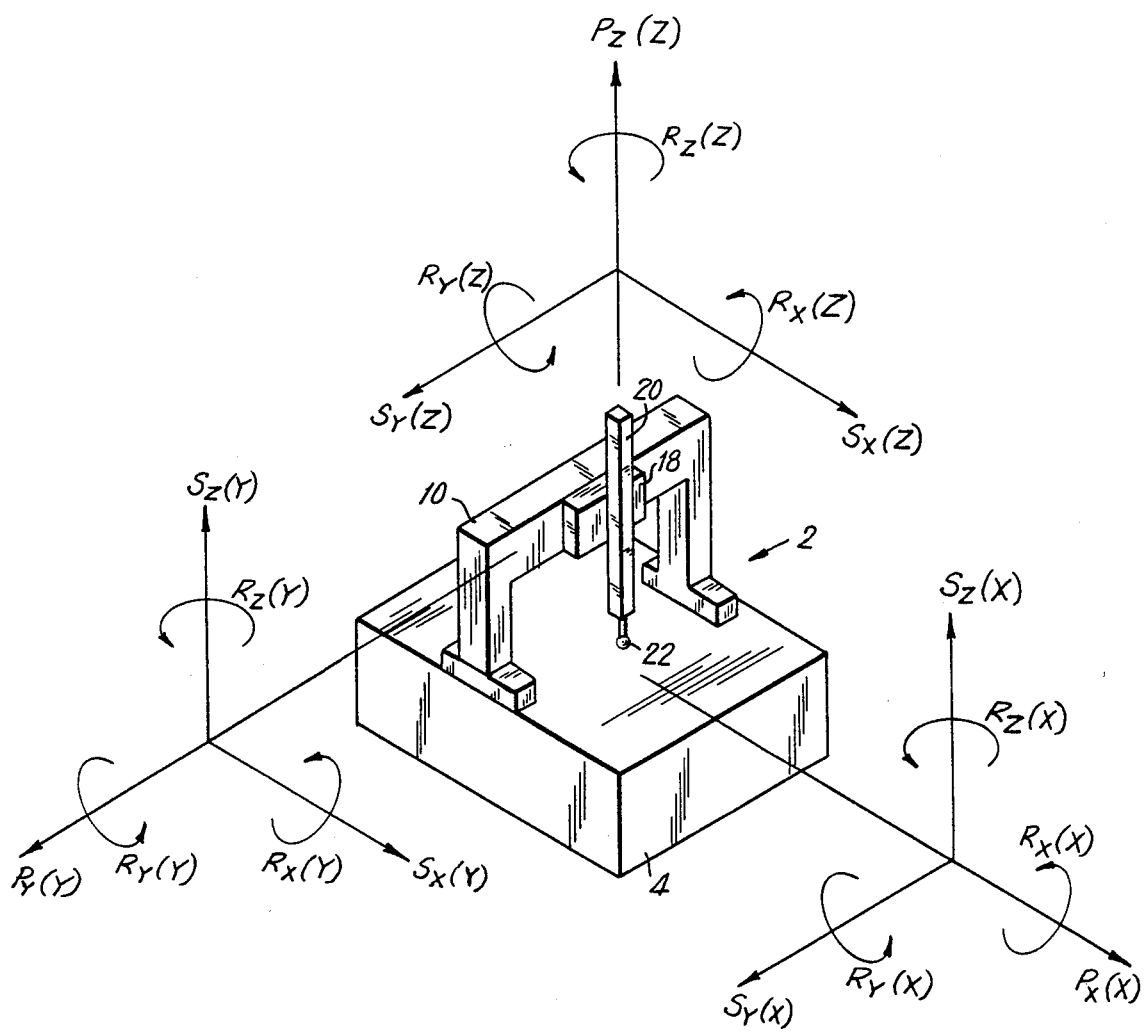
FIG. 3 is a diagrammatic representation of possible errors associated with the bridge-type machine depicted in FIG. 1.

To facilitate an understanding of the various errors that can be introduced by a coordinate measuring machine, for example, the bridge-type machine described herein, reference is now made to FIG. 3 of the drawing.

Typically there are six error sources attributable to each direction in which the coordinate measuring machine is capable of movement. For example, in the X-axis there are three rotational errors defined as $R_x(X)$, $R_y(X)$ and $R_z(X)$, where the subscript refers to the axis of rotation and the functional dependence is displayed explicitly. The common names for these three errors are roll, pitch and yaw, respectively.

Another error is associated with motion in the direction of the X axis and is called "positioning error". The positioning error is indicated in FIG. 3 as $P_x(X)$.

The final two errors, still with respect to the X-axis, are in the mutually perpendicular direction of motion, that is, in the Y or Z direction. They are commonly referred to as "straightness of motion" or simply "straightness" errors. The straightness errors are indicated in FIG. 3 by $S_y(X)$ and $S_z(X)$.

Table 1 which follows summarizes for a typical carriage coordinate system, such as shown in FIG. 3, the definitions of the sources of error in each degree of freedom with respect to the X axis alone.

TABLE 1

| NOTATION | DEFINITION |
|---|---|
| $P_x(X)$ | Positioning error along X motion |
| $S_y(X)$ | X Straightness error along Y direction |
| $S_z(X)$ | X Straightness error along Z direction |
| $R_x(X)$ | Carriage rotation about X-axis |
| $R_y(X)$ | Carriage rotation about Y-axis |
| $R_z(X)$ | Carriage rotation about Z-axis |

Of course, in a typical coordinate measuring machine, three dimensional movement is usually required. Thus, the errors present for linear motion in the X direction are similarly present for motion in the Y and Z directions. Table 1 may therefore be expanded to Table 2, which summarizes the significant errors of a three dimensional coordinate measuring machine, such as that shown in FIG. 3.

TABLE 2

| NOTATION | DEFINITION |
|---|---|
| $P_x(X)$ | X axis positioning error along X motion |
| $P_y(Y)$ | Y axis positioning error along Y motion |
| $P_z(Z)$ | Z axis positioning error along Z motion |
| $S_y(X)$ | X axis straightness error along Y direction |
| $S_z(X)$ | X axis straightness error along Z direction |
| $S_x(Y)$ | Y axis straightness error along X direction |
| $S_z(Y)$ | Y axis straigttness error along Z direction |
| $S_x(Z)$ | Z axis straightness error along X direction |
| $S_y(Z)$ | Z axis straightness error along Y direction |
| $R_x(X)$ | X Carriage rotation error about X axis |
| $R_y(X)$ | X Carriage rotation error about Y axis |
| $R_z(X)$ | X Carriage rotation error about Z axis |
| $R_x(Y)$ | Y Carriage rotation error about X axis |
| $R_y(Y)$ | Y Carriage rotation error about Y axis |

TABLE 2-continued

| NOTATION | DEFINITION |
|---|---|
| $R_z(Y)$ | Y Carriage rotation error about Z axis |
| $R_x(Z)$ | Z Ram rotation error about X axis |
| $R_y(Z)$ | Z Ram rotation error about Y axis |
| $R_z(Z)$ | Z Ram rotation error about Z axis |

Thus, as depicted in FIG. 3, a three dimensional coordinate measuring machine will have eighteen sources of error when simultaneously moving the bridge structure 10, the Y carriage 18 and the ram 20 from one point to another point in space.

Industry has sought to minimize these errors to increase the accuracy of the coordinate measuring machine. However, other than by pre-calibration, the accuracy of the coordinate measuring machine has heretofore been limited to the ability to manufacture the components of the machine under close tolerances. The present invention, on the other hand, takes a different approach for increasing the accuracy of a coordinate measuring machine by minimizing the effect of many of these error sources, which allows the manufacturing tolerances of the components comprising the coordinate measuring machine to be relaxed.

To accomplish this, eight of the eighteen sources of error introduced by a coordinate measuring machine, and which are typically the largest sources of errors, are reduced by the method and design of the present invention. The sources of error affected by the compensation process of the present invention are listed in Table 3.

TABLE 3

| NOTATION | DEFINITION |
|---|---|
| $S_x(Z)$ | Z axis straightness error along X direction |
| $S_y(Z)$ | Z axis straightness error along Y direction |
| $R_x(X)$ | X Carriage rotation error about X axis |
| $R_y(X)$ | X Carriage rotation error about Y axis |
| $R_x(Y)$ | Y Carriage rotation error about X axis |
| $R_y(Y)$ | Y Carriage rotation error about Y axis |
| $R_x(Y)$ | Z Ram rotation error about X axis |
| $R_y(Z)$ | Z Ram rotation error about Y axis |

Figure 4:
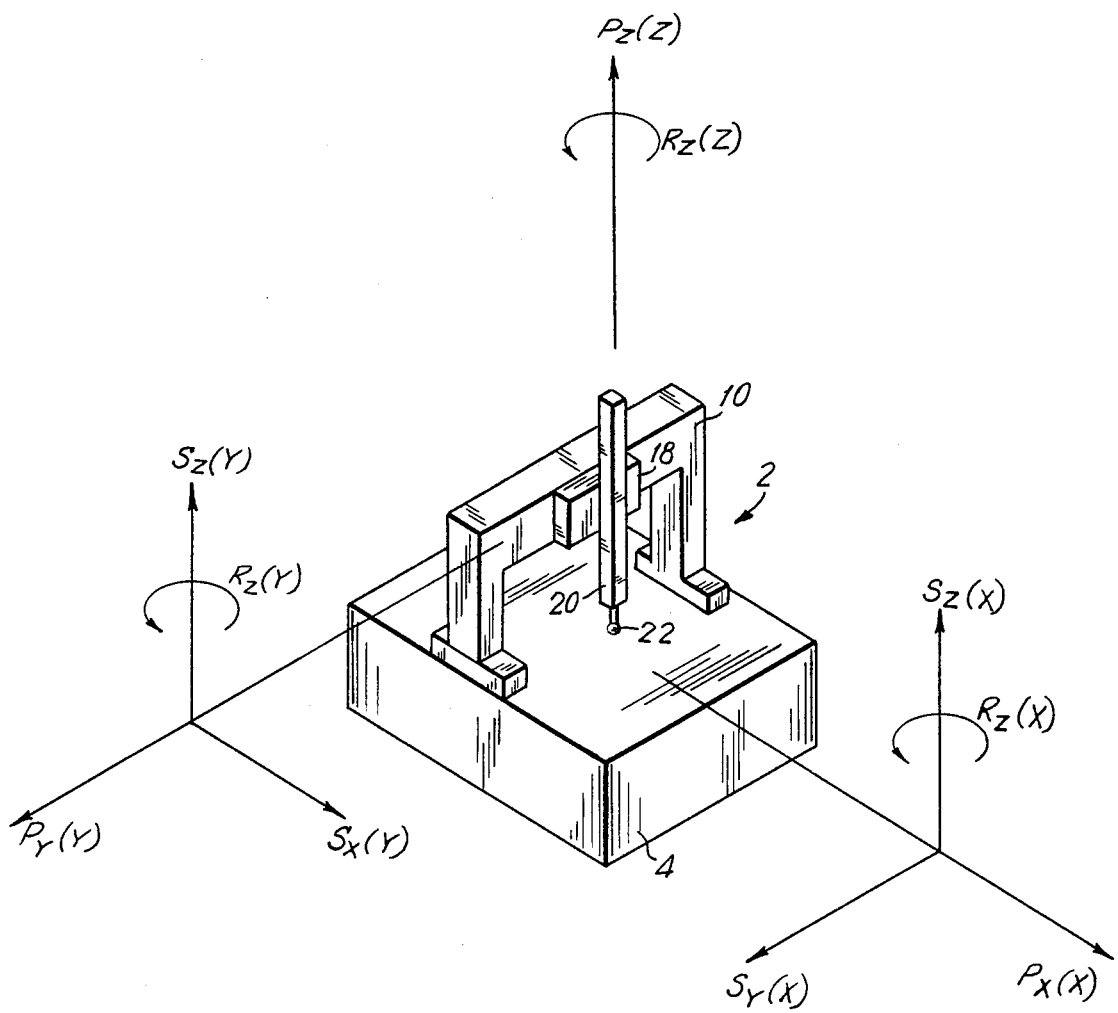
FIG. 4 is a diagrammatic representation, similar to FIG. 2, which illustrates the errors remaining in a typical bridge-type machine achieved with the present invention.

Thus, as pictorially represented in FIG. 4, the compensation method of the present invention will reduce the degrees of freedom of a typical coordinate measuring machine from a total of eighteen sources of error to only ten sources of error.

Furthermore, the method of the present invention reduces these errors without the need for a pre-calibration test run of the coordinate measuring machine, thereby eliminating the need for the mass storage of data during the test run, and eliminating unnecessary down time of the coordinate measuring machine for the pre-calibration test.

Furthermore, the method of the present invention provides the coordinate measuring machine with the capability of immediately compensating the system for any non-repeatable errors which may occur during part inspection, such as changes to the structural geometry of the machine due to environmental stresses, such as humidity and temperature, or vibrational errors caused by machinery in the surrounding area, for example.

As mentioned previously, one of the major causes of positional errors in a typical coordinate measuring machine is due to the fact that measurements are taken remotely from where the part under inspection is located. The probe 22 which detects when contact with the part 8 is made is positioned at the free end of the ram 20. However, the position of the free end of the ram (and the probe 22) measured in the Z direction and referenced to the zero reference point is determined by graduated bar 32 and optical reader 34 positioned remotely from the ram's free end, that is, at a point where the ram 20 is mounted to the Y-carriage 18.

Likewise, the position of the ram 20 along the Y axis is measured remotely from where the probe contacts the object, that is, by graduated bar 28, which extends along the cross-member of the traveling bridge, and reader 30. Similarly, the position of the ram 20 along the X axis is measured by bar 24 mounted to the base 4 of the coordinate measuring machine, and reader 26.

The ram 20 may not always remain perpendicular to the object supporting surface 6 of the base when the ram is being moved on the Y-carriage 18, or when the Y-carriage 18 is being moved on the traveling bridge 10, or when the traveling bridge 10 is being moved on the base 4 of the coordinate measuring machine 2. In other words, the ram 20 may tilt with respect to the base 4, and this tilt may affect the measurement of the true coordinates of the object 8 being inspected.

This error which may be introduced whenever the object being measured is remotely positioned from the measuring transducer or indicator is referred to as "Abbe error". The composite errors in a coordinate measuring machine due to the Abbe effect is the resultant or vectoral sum of the Abbe errors in each of the three coordinate axes.

Each movable component of the coordinate measuring machine 2, that is, the traveling bridge 10, the Y-carriage 18 and the ram 20, may contribute some error to the positional measurements of the object 8 being inspected.

Some of the Abbe errors associated with the bridge-type coordinate measuring machine are illustrated in FIGS. 5 and 6.

Figure 5B:
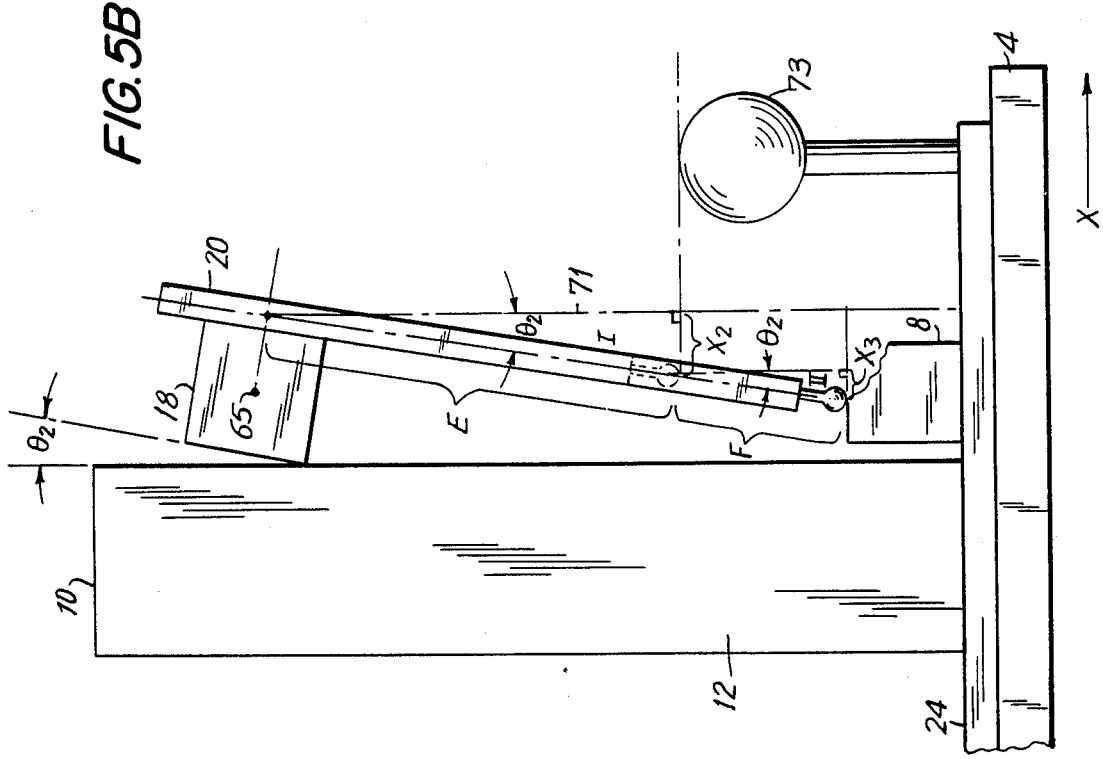
FIGS. 5a through 5d are diagrammatic representations of a bridge-type coordinate measuring machine, shown in side view.
Figure 5A:
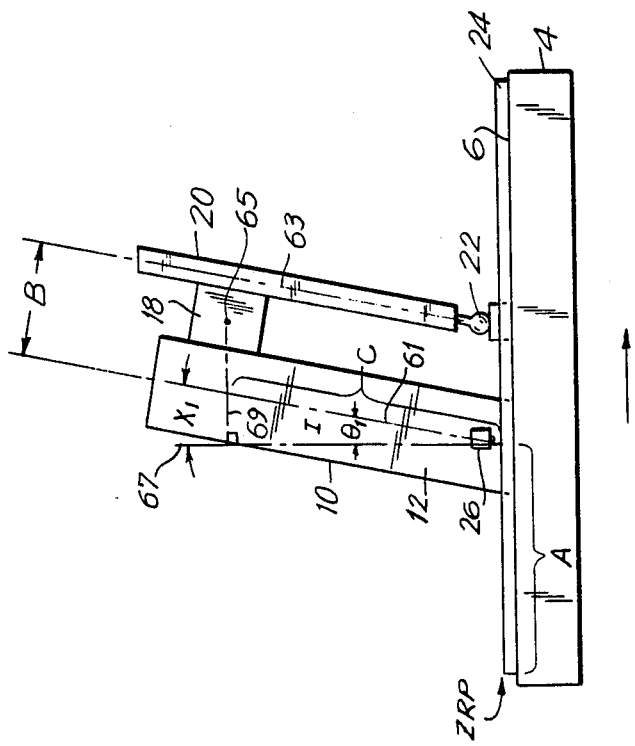

FIG. 5a shows the X component of an error caused by the traveling bridge tilting in the X direction. As mentioned previously, a scale or graduated bar 24 is usually mounted on the base 4 adjacent to one of the columns 12 of the traveling bridge, and a reference mark or optical reader 26 is positioned on one of the columns 12, for example along the center line thereof (shown as dashed line 61 in FIG. 5a). The bar 24 and optical reader 26 would measure the traveling bridge as being A distance from the zero reference point (indicated as ZRP). To this is normally added the known value of B, which is the distance from the center line 61 of the bridge 10 to the center line of the ram and probe (shown as dashed line 63), so that the position of the probe 22 from the zero reference point ZRP in the X direction is apparently the sum of distances A and B.

Also, the location of the center of rotation of the Y carriage 18 in the X direction on the bridge 10, as shown as dot 65, is determinable. Therefore, the distance C (see FIG. 5c) from the X scale or bar 24 to the center of rotation of the Y-carriage 18, when the bridge is in its normal untilted state, may be measured.

If the traveling bridge 10 tilted in the X direction by an angle $\theta_1$, with respect to a normal 67 to the base 4, the measured distance A+B from the zero reference point ZRP in the X direction of the object 8 will not be an accurate representation of the true distance.

To calculate a close approximation to the true distance of the object 8 from the zero reference point ZRP, a hypothetical right triangle I may be imagined as being defined by the normal 67 to the base, the center line 61 of column 12 and a perpendicular 69 to normal 67 which passes through the center of rotation of the Y-carriage 18 on an untilted bridge 10, with a portion of the center line 61 of the column 12 constituting the hypotenuse of the hypothetical triangle. The distance, $X_1$, shown in FIG. 5a represents an approximation of the X-component of error due to the tilt of the bridge 10. This X component of error is trigonometrically a function of angle $\theta_1$, and is equal to the fixed distance C that the center of rotation of the Y-carriage 18 is vertically above X scale 24, multiplied by the sine of angle $\theta_1$.

In a similar manner, the Y-carriage 18 may theoretically have a component of tilt in the X-direction. As illustrated by FIG. 5b, the Y carriage 18 may exhibit an angle of rotation $\theta_2$ ( referenced to a normal 71 to the base 4), which will affect the position of the probe tip relative to the X scale or graduated bar 24. The error due to the rotation of the Y carriage in the X axis can be divided into two X components, $X_2$ and $X_3$, which are each trigonometrically related to $\theta_2$, as illustrated by the two hypothetical right triangles shown in FIG. 5b.

Figure 5D:
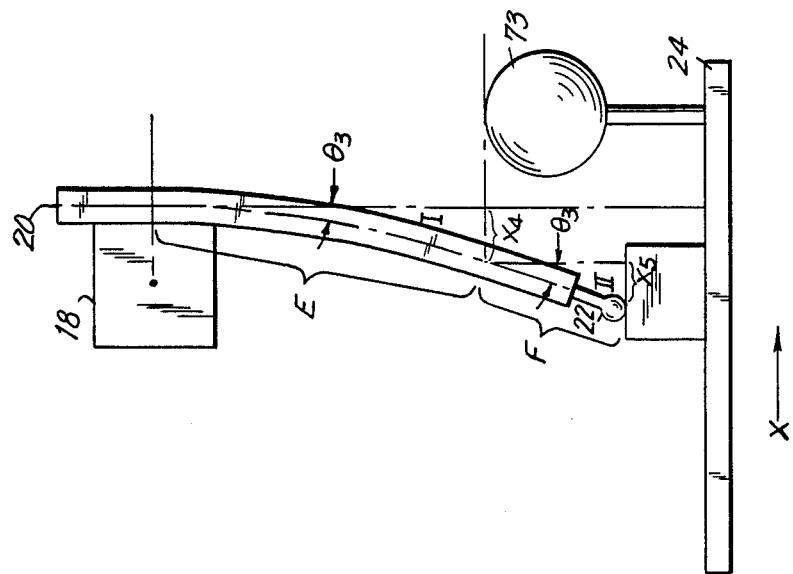
Figure 5C:
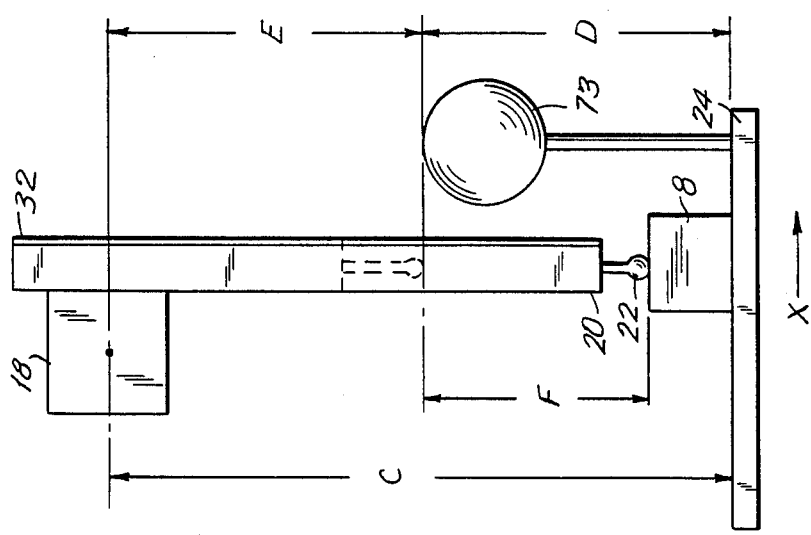

As illustrated by FIG. 5c, the distance from the center of rotation of the Y carriage 18 to the X scale or bar 24 is a known quantity C, and the height D of the qualification cube or sphere 73 above the X scale or bar 24 is also known.

During probe qualification, the ram 20 is lowered until the probe 22 contacts the qualification sphere 73. The ram graduated bar 32 (extending in the Z axis) is noted, and may read, for example, 900 units (of graduations on the bar). Thus, it can be determined that a reading of 900 units on the ram scale 32 is equivalent to a distance D above the X scale 24, and that the distance E from the center of rotation of the Y carriage 22 to the tip of the probe 22 when it touches the qualification sphere 73 is equal to the difference between C and D.

Any further extension of the ram 20 (or retraction) from the point at which the probe 22 just touches the qualification sphere 73 (in the example, the 900 unit mark on bar 32) can be added to or subtracted from the fixed distance E between the center of rotation of the Y carriage 18 and the qualiifcation sphere 73, in order to calculate the variable distance that the ram 20 moves as it probes the object 8 under inspection.

Referring now back to FIG. 5b, the hypotenuse of the first triangle I can be defined by a portion of the center line 63 of the ram 20 from the center of rotation of the Y carriage 18 to the disqualification sphere 73, which is equal to the fixed distance E measured during initial qualification of the probe. $X_2$, the amount of error in the X direction due solely to the rotation of the Y carriage 18 and to the fixed and known distance E that the ram and probe extend from the rotational center of carriage 18 to touch the qualification sphere 73, is illustrated by FIG. 5b as being the side of the hypothetical triangle I that is opposite angle $\theta_2$. This error in distance, $X_2$, is equivalent to the fixed distance E (which is C minus D), multiplied by the sine of the angle $\theta_2$, from trigonometric principles.

The second hypothetical triangle II is illustrated by FIG. 5b as directly below the first triangle I. Triangle II represents the X component of error, $X_3$, caused by the rotation of the Y carriage 18 and the variable distance the ram 20 and probe 22 further extend beyond the predetermined distance E in order to touch the object B. The second triangle II is a similar triangle of the first, and the component of error, $X_3$, is opposite the same angle $\theta_2$. The hypotenuse of the second triangle II is the variable (but measurable) distance F that the ram and probe extend from the point at which it touches the qualification sphere 73 to the object 8 under inspection. Thus, again by trigonometry, $X_3$, will be equal to the distance F multiplied by the sine of the angle $\theta_2$. The total X component of error due solely to the rotation of the Y carriage 18 in the X direction would be equal to the sum of $X_2$ and $X_3$.

The ram 20 may also have an X component of bend as it moves in the Z direction on the Y carriage 18. This is illustrated by FIG. 5d. To simplify the following explanation, it is assumed that the bend in the ram produces a constant angle of deviation. As with the situation with the rotation of the Y carriage 18, the deviation of the ram can be expanded into a first error component, $X_4$, that depends on the angle of ram deviation, angle $\theta_3$, and the fixed distance E that the ram and probe extend from the center of rotation of the Y carriage 18 to the qualification sphere 73, or the difference between distances C and D in FIG. 5c; and a second error component, $X_5$, that depends on angle $\theta_3$ and the variable but measurable distance F that the ram must travel from the qualification sphere 73 to the object 8 under inspection.

As with the error caused by the Y carriage 18, two similar right triangles may be envisioned for determining $X_4$ and $X_5$. The hypotenuse of the first triangle I is equal to the known value E (which equals C minus D) with the X component of error $X_4$ represented by the side opposite angle $\theta_3$. Therefore, $X_4$ may be calculated as being the distance E multiplied by the sine of angle $\theta_3$.

The hypotenuse of the second triangle II is equal to the variable but measurable distance F, the length the ram and probe are extended to (or retracted from) their position where the probe 22 touches the qualification sphere 73 in order to contact the object 8 under inspection. This variable component of error, $X_5$, is represented by the side of the second triangle II opposite the angle $\theta_3$. $X_5$ may be derived as being the distance F multiplied by the sine of angle $\theta_3$, so that the total error in the X direction due solely to the bend in the ram 20 is the sum of $X_4$ and $X_5$.

The total effect of the Abbe errors is the sum of the errors associated with each movable component of the coordinate measuring machine. The apparent position on the X axis scale 24 must be adjusted by adding or subtracting each of $X_1$ through $X_5$.

The Y components of the Abbe errors discussed above are illustrated by FIGS. 6a through 6c.

The Y coordinate scale or graduated bar 28 is usually mounted on the cross-member 16 of the traveling bridge 10, and the reference mark or reader 30 is provided on the Y carriage 18. The bar and reader would measure the distance in the Y direction of the ram 20 and probe 22 from the center line 75 (for example) of one of the columns 12 as being G distance (as shown in FIG. 6a). The center of the column can be measured as an apparently fixed distance H in the Y direction from the zero reference point ZRP. Thus, the Y scale or bar 28 is referenced to the zero reference point ZRP. Ram 20 and probe 22 appear to be the sum of distances G and H from the zero reference point ZRP.

However, if the X carriage 10 tilts in the Y direction as it travels on the surface 6 of the base (as shown in FIG. 6a and indicated by angle $\theta_4$ formed by the center line 75 of column 12 and a normal (dashed line 77) to the base's surface 6), the tilt will affect the measurement of the object's position, so that the true position of the object in the Y direction will not equal the measured position of the sum of G and H distances referenced to the zero reference point ZRP.

Also, because the Y scale 28 is mounted on the cross-member of the bridge 10, the tilt of the bridge 10 will displace the position of the Y scale 28 with respect to the object 8. The vertical distance, J, between the surface 6 of the base 4 on which the object 8 rests and the Y scale or graduated bar 28 is a fixed and measurable quantity. Distance J will be used in calculating the Y component of error due to the tilt of the bridge 10.

A right triangle I may be envisioned, as illustrated in dashed lines by FIG. 6a, and includes a hypotenuse that equals the fixed distance J from the base 4 to the Y scale 28. The Y component of error, $Y_1$, due to the bridge tilt is represented by approximation by a side of the triangle I opposite the angle of tilt, angle $\theta_4$. This tilt error, $Y_1$, is equal to the distance J multiplied by the sine of the angle $\theta_4$.

FIG. 6b illustrates the Y component of error, $Y_2$ caused solely by the rotation of the Y carriage 18 on the bridge in the Y direction. It should be noted that the center of rotation of the Y carriage in the Y direction need not be the same as its center of rotation in the X direction. However, each center of rotation may be determined through measurements.

By knowning the distance from the y-scale or bar 28 to the base's surface 6, J, and the height K of the qualification sphere 73 above the base's surface 6, the reading on the ram scale 32 at which the probe 22 contacts the qualification sphere 73 may be calibrated by calculating the difference between J and K. From this reading, all other changes in the Z axis position of the ram 20 from the ram's position at qualification may be determined.

If the Y carriage tilts about its Y rotation center, shown as dot 79 in FIG. 6b, for example by an angle $\theta_5$, the ram 20 and probe 22 will not be perpendicular to the surface 6 of the base 4 on which the object 8 is resting and will be offset in the Y direction, which affects the Y positional measurement data.

Two hypothetical right triangles may be envisioned for calculating the Y component of error due to the Y carriage's tilt. The hypotenuse of the first triangle I is the difference between the distances J and K, or the length of the ram 20 and probe 22 from the y-scale 28 to the qualification sphere 73. The Y component of error, $Y_2$, is represented as the side of the first triangle I opposite the angle $\theta_5$, which is formed between a true perpendicular 81 to the bases's surface, and the center line 83 of the displaced ram 20. The Y component of error, $Y_2$ may be calculated as the distance J minus K multiplied by the sine of the angle $\theta_5$.

The second triangle II is a similar triangle to the first, and includes the same angle $\theta_5$ defined by the displaced ram's center line 83 and the perpendicular 81 to the base's surface 6. The second Y component of error, $Y_3$, is dependent upon the tilt of the Y carriage 18 and the distance L that the ram extends or retracts from its measured distance to the qualification sphere 73, or J minus K. The hypotenuse of the second triangle II represents this variable but measurable distance L, and the side of the triangle opposite the angle $\theta_5$ represents the Y component of error, $Y_3$. $Y_3$ may be calculated as being equal to the distance L multiplied by the sine of the angle $\theta_5$. The total Y component of error caused solely by the tilt of the Y-carriage 18 is the sum of $Y_2$ and $Y_3$.

Figure 6C:
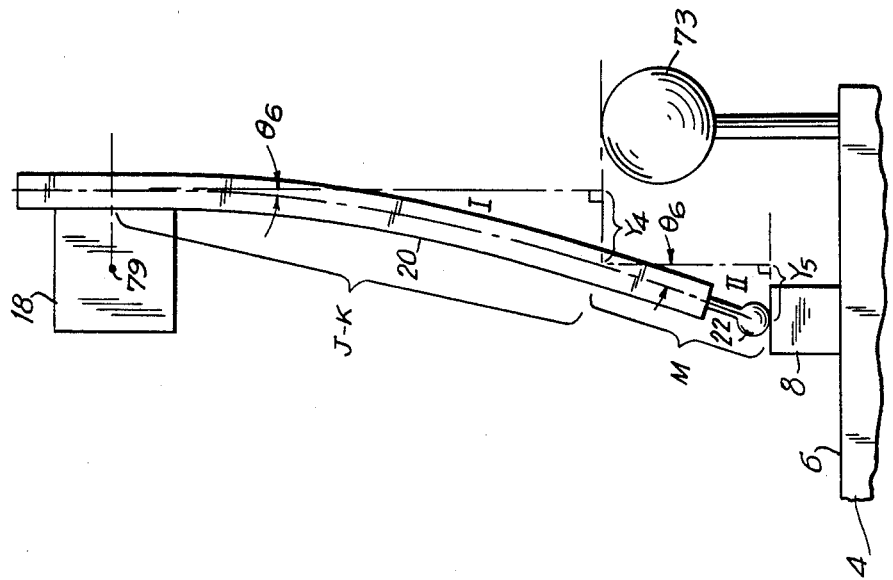
Figure 6A:
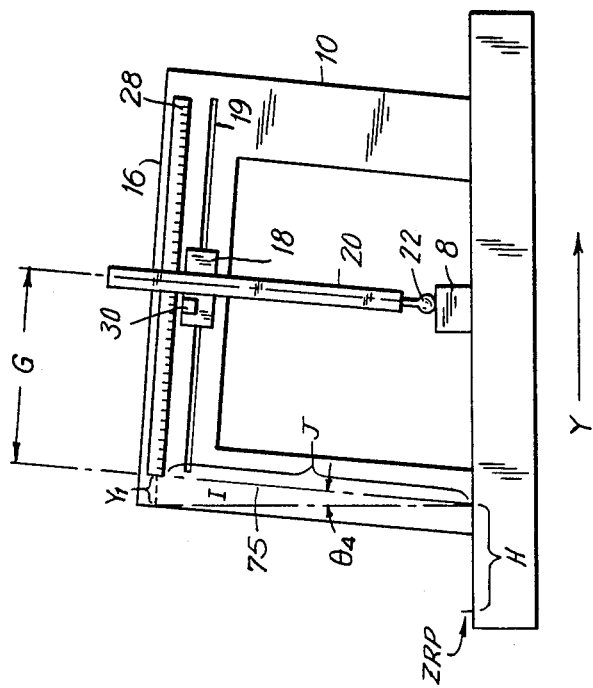

FIG. 6c shows the Y component of error due solely to the bend in the ram 20 as it moves in the Z direction on the Y carriage 18. The method for calculating this error is analogous to that for calculating the X component of the ram bend. That is, two similar right triangles may be envisioned. The hypotenuse of the first triangle I represents the distance from the y-scale 28 to the qualification sphere 73, or J minus K, and the side opposite the angle of ram bend, angle $\theta_6$, formed between the center line 83 of the ram 20 and a perpendicular 85 to the base's surface 6, represents portion $Y_4$ of the Y component of error. $Y_4$ is thus equal to the distance J minus K multiplied by the sine of angle $\theta_6$.

The second triangle II has a hypotenuse that represents the length M that the ram 20 and probe 22 must move from its position at qualification in order to contact the object 8 being inspected. The side of the second triangle II opposite angle $\theta_6$ represents the remaining portion, $Y_5$, of the Y component of error due to the ram bend. $Y_5$ is calculated by multiplying the distance M and the sine of angle $\theta_6$. The total Y component of error due solely to ram bend is the sum of $Y_4$ and $Y_5$.

All of the Y components of errors, $Y_1$ through $Y_6$, attributable to each of the movable elements of the coordinate measuring machine must be summed and used to adjust the apparent, measured positional data of the object in the Y direction.

Again referring to FIGS. 1 and 2 of the drawings, a typical coordinate measuring machine 2, such as the bridge-type illustrated, is modified in accordance with the present invention to include a number of sensors that can detect and measure the angular deviation of the particular components of the coordinate measuring machine on which they are mounted from a reference plane.

Two sensors 38, 40 are mounted on the ram 20 and preferably inside the ram. One ram sensor 38 is positioned in the Z-X plane, while the other ram sensor 40 is positioned in the Z-Y plane. Thus, the ram sensors 38, 40 can accurately determine the deviation of the ram 20 from true vertical, in other words, the slope of the ram from the Z direction and in the X or Y direction.

An X-coordinate angle sensor 42 and a Y-coordinate angle sensor 44 may be mounted to the X-carriage or traveling bridge 10, and an X-coordinate angle sensor 46 and a Y-coordinate angle sensor 48 may be mounted to the Y-carriage 18. This is because each of the X and Y-carriages 10, 18 may add to the overall Abbe error of the coordinate measuring machine 2.

Each movable component of the coordinate measuring machine, that is, the ram 20, the Y-carriage 18 and the X-carriage 10, should include X and Y angle sensors, so that their contribution to the overall measurement errors of the coordinate measuring machine 2 may be compensated for. In actuality, the measurement errors due to the tilt of the traveling bridge structure 10 and Y-carriage 18 in the X and Y directions are small when compared to the errors resulting from the tilt of the ram 20 itself. In order to simplify the explanation of the present invention, the tilt of the X and Y-carriages will be considered negligible and not affecting the measurements taken by the coordinate measuring machine.

The sensors used on the components of the coordinate measuring machine to measure their tilt or angular deviation are typically inclinometers which are readily purchasable. They are usually referenced to the vertical by gravity. A suitable inclinometer which may be used is a DC-voltage operated, gravity-referenced tilt sensor manufactured by Schaevitz Engineering Company.

Because the ram 20 is mounted to a supporting structure (for example, the X and Y carriages in the bridge-type coordinate measuring machine), which is mounted on the base 4, the angular deviation of tilt of the base will affect the angularity measurements of the ram sensors 38, 40. In other words, the ram sensors 38, 40 will respond to and measure the combined tilt of the whole machine 2 and the ram 20. For this reason two sensors 58, 60 referenced to the same plane, such as vertical, as those of the ram 20 and other components are mounted on the base 4. One base sensor 58 is mounted in the direction of the X-axis, or longitudinal with the base 4. The other base sensor 60 is mounted in the direction of the Y-axis, or transverse to the base 4.

By subtracting the angular deviation of the base 4 measured by the base sensors 58, 60 from the angular deviation of the ram 20 measured by the ram sensors 38, 40, the actual tilt or non-perpendicularity of the ram 20 with respect to the base's surface can be determined.

Figure 9:
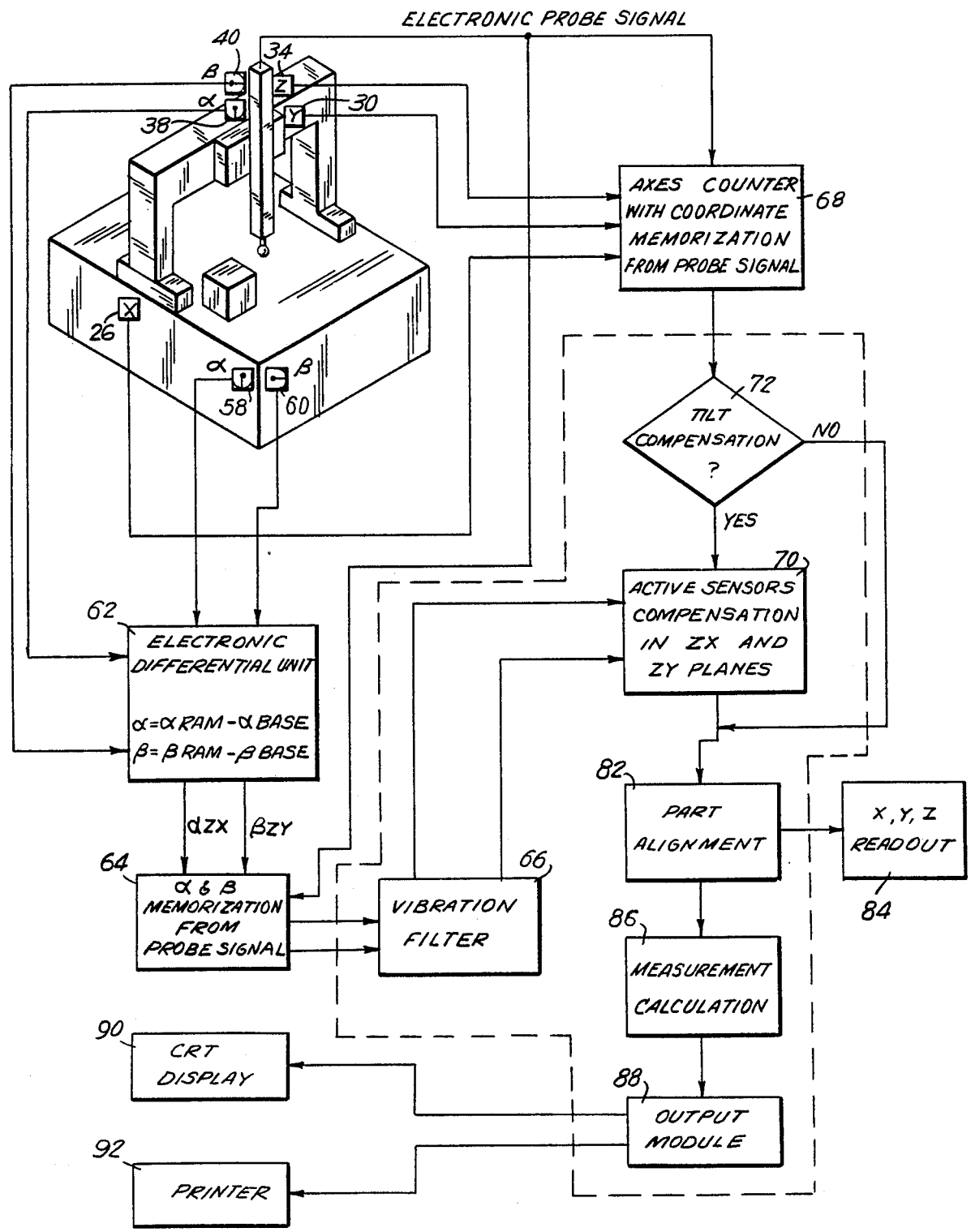
FIG. 9 is a block diagram of the error-compensation system of the present invention which is adapted to compensate a coordinate measuring machine such as that shown in FIG. 1 for measurement errors.

Reference is now made to FIG. 9 of the drawings. The two sensors mounted to each of the ram 20 and base 4 are connected to an electronic differential unit or circuit 62, and provide the electronic differential unit 62 with output signals representative of the angular deviations that they measure. The electronic differential unit 62 calculates the differences of the angular deviation data between the ram X axis sensor 38 and the base X axis sensor 58. Similarly, the electronic differential unit 62 calculates the difference between the angular deviation data of the ram Y axis sensor 40 and the data from the base Y axis sensor 60. The difference data represents the amount of error attributable solely to the non-perpendicularity of the ram 20 with respect to the base 4.

The angular deviation difference data for the X and Y axes is supplied to a storage or memorization unit 64. The storage unit 64 is responsive to a signal from the electronic probe 22 mounted at the tip of the ram 20 that indicates when contact is made between the probe 22 and the object 8 secured to the supporting surface 6 of the base 4. When contact is made, the electronic probe 22 sends a signal to the storage unit 64 which enters the continuously changing difference data supplied from the electronic differential unit 62 into a computer memory, an electronic register circuit or the like.

The difference data that is locked into memory in the storage unit 64 may be directed to a vibration detector 66, if such is desired.

The vibration detector 66 is typically a comparator circuit having a preselected maximum vibration constant programmed therein. The vibration constant used for comparison purposes in the vibration detector 66 may be arbitrarily chosen, or may be the average of several readings of different data measured by the angle sensors of the coordinate measuring machine.

In the event that the difference data stored in the memory of the storage unit 64 exceeds the maximum vibration constant of the vibration detector 66, the data will be disregarded and the coordinate measuring machine will be automatically instructed to repeat the particular measurement.

Thus the vibration detector 66 will filter out any anomalous readings from the angle sensors 38-48, 58 and 60 of the coordinate measuring machine, such as may be caused by a vibration generating event, for example, an object which is dropped or a machine operating near the area where the coordinate measuring machine is situated.

The positional data from the X axis, Y axis and Z axis position transducers such as bars 24, 28, 32 and readers 26, 30, 34 is supplied to a second storage or memorization unit 68. Additionally, the signal from the electronic probe 22 that indicates when contact is made between the probe and the object 8 being inspected is supplied to the second storage unit 68. When contact is made between the probe 22 and the object 8, the second storage unit 68 will respond to the probe signal and enter the continuously changing positional data from the position transducers into registers or similar devices within the unit 68.

The difference data which is not rejected by the vibration detector 66 is supplied to a compensation unit 70. The compensation unit 70 may be a separate electronic circuit or other equivalent device, or may be a subroutine program of the computer normally associated with a coordinate measuring machine.

The compensation unit 70 also receives the stored positional data from the second storage unit 68. If no error compensation is required, the operator of the coordinate measuring machine may at his option instruct the error compensation system of the coordinate measuring machine to allow the positional data from the storage unit 68 to by-pass the compensation unit 70. Such action is indicated by decision block 72 in FIG. 10. The operator may wish to by-pass the compensation step when the part tolerances of some surfaces are not critical.

After receiving the difference data from the first storage unit 64 and the positional data from the second storage unit 68, the compensation unit 70 will adjust the positional data to compensate for the errors introduced by the machine.

A mathematical algorithm is used to determine the actual position of the ram and probe in space, referenced to the zero reference point. This algorithm is based on general trigonometric concepts, and will be described below.

Reference is now made to FIG. 7 of the drawings for an illustration and explanation of the operation of the present invention, and the principles on which the compensation of measurements made by the coordinate measuring machine of the present invention are based.

The zero reference point is first established. It is usually chosen as one corner of the base, and all measurements are made with respect thereto. However, a zero reference point may be a particular point on the object to be inspected, in which case all measurements are made relative thereto. In this situation, the compensated measurements can be the actual dimensions of the part being inspected.

The probe 22 used on the coordinate measuring machine is then "qualified". As discussed previously, this is customarily done with a precision cube or sphere 73 securely mounted to the surface 6 of the base 4. The probe 22 is advanced until it touches the qualification sphere 73. The measurements are read and retained in memory or the like. If it is necessary to switch probes for one reason or another, for example, to allow deeper penetration into a recess formed in the surface of the inspected object 8, the new probe is also qualified by advancing it to the same point on the qualification object. The difference between qualification measurements of the two probes will be used to adjust the new data taken by the substitute probe.

To make measurements in the X-Y plane, the probe 22 is affixed to the free end of the ram 20 so that it extends co-axially thereto as an extension of the ram. The ram 20 and probe 22 are maneuvered until the probe 22 contacts the object 8, at which point the coordinate axis measurements and the angle of tilt measurements are entered into the computer memory.

If, for example, the Y-component of tilt of the ram is angle $\theta_7$ (measured from a normal 87 to the base's surface 6), as shown by FIG. 7, and the ram 20 and probe 22 extend N distance in inches from the Y scale or bar 28 to the object 8 being inspected, the length along the Y-axis which must be added to or subtracted from (depending on the direction in the Y-axis the ram 20 and probe 22 tilt) the Y-axis measurement is shown as:

$$Y = N \times \sin \theta_7 \quad \text{(Eq. 1)}$$

where
Y = the Y-axis compensation value (the quantity to be added to or substracted from the Y-coordinate measurement);
$\theta_7$ = the angular deviation of the ram 20 in the Y direction from a normal 87 to the base; and
N = the distance from the Y scale 28 to the point of contact on the object 8.

A more usable algorithm which is equivalent to Equation 1 above for small angles of tilt is as follows:

$$Y = N \times \theta_7 \times 0.000005 \quad \text{(Eq. 2)}$$

where
N = the distance from the Y scale 28 to the point of contact on the object 8; and
$\theta_7$ = the angular deviation in arc seconds of the ram 20 in the Y direction from a normal 87 to the base 4.

Equation 2 is preferred because it is more readily convertible into machine language for programming.

As mentioned previously, the traveling bridge 10, Y-carriage 18 and ram 20 travel on the base 4 of the bridge-type coordinate measuring machine 2. Therefore, the angle sensors on each of these movable components will be affected by the tilt of the base 4, shown in FIG. 7 as angle $\theta_8$ (referenced to the vertical, shown as a dashed line 89). Therefore, the Y angle sensor 40 on the ram 20, if referenced to the vertical, will provide a reading of angle $\theta_9$ as the tilt of the ram and base, or $$\theta_9 = \theta_7 + \theta_8$$

However, the Y sensor 60 on the base will measure angle $\theta_8$, so that before actual adjustment of the Y coordinate measurement takes place, the tilt of the base 4 in the Y direction measured as angle $\theta_8$ by the Y base sensor 60, is subtracted from the combined tilt of the ram and base, measured as angle $\theta_9$ by the Y ram sensor 40, to arrive at the true angle of tilt of the ram with respect to the base. This is shown below as Equation 3:

$$Y = N \times (\theta_9 - \theta_8) \times 0.000005 \quad \text{(Eq. 3)}$$

where
$\theta_9$ and $\theta_8$ are measured in arc seconds.

Compensation for ram tilt in the X direction is performed in an analogous manner using the formula given below:

$$X = P \times (\theta_{10} - \theta_{11}) \times 0.000005 \quad \text{(Eq. 4)}$$

where
- $X$ = the axis compensation value (the quantity to be added to or substracted from the X-coordinate measurement);
- $P$ = the distance from the center of rotation of the Y carriage to the point of contact on the object 8, such as distance $E+F$ in FIG. 5d;
- $\theta_{10}$ = the angular deviation in arc seconds of the ram 20 and base 4 from the vertical, as measured by the X ram sensor 38; and
- $\theta_{11}$ = the angular deviation in arc seconds of the base 4 from the vertical, as measured by the X base sensor 58.

An example of how the system of the present invention compensates for errors in the X-Y plane will now be provided. With the electronic probe 22 mounted in the $-Z$ direction, that is, vertically downwardly from the ram 20, and with the ram sensors 38,40 and base sensors 58,60 mounted in the direction of the X and Y axes, as previously discussed, the position of the probe 22 in the X and Y direction may be compensated.

The following measurements are made when the probe makes contact with the object being inspected:

TABLE 4

| | |
|---|---|
| X axis position of probe = | 2.0000" |
| Y axis position of probe = | 8.0000" |
| Z axis position of probe = from the Y-scale | −14.0000" |
| Z axis position of probe = from the center of rotation | −13.0000" |
| X ram sensor = | 3 arc sec |
| X base sensor = | 1 arc sec |
| Y ram sensor = | 4 arc sec |
| Y base sensor = | 1.5 arc sec |

From Equation 3, repeated below:

$$Y = N \times (\theta_9 - \theta_8) \times 0.000005$$

it is seen that
$Y = 14 \times (4 - 1.5) \times 0.000005$
$Y = 0.000175$ inches

Therefore, the compensated position of the probe 22 in the Y-direction is the sum of the measured Y-axis position of the probe 22 and the Y compensation error value, or 8.000175".

Similarly, compensation in the X-direction uses Equation 4:
$X = P \times (\theta_{10} - \theta_{11}) \times 0.000005$
$X = 13 \times (3 - 1) \times 0.000005$
$X = 0.000130$ inches Therefore, the compensated position of the probe 22 in the X-direction is the sum of the measured X axis position of the probe 22 and the X axis compensation value, or 2.000130".

In theory, the measured length which the ram 20 and probe 22 extend in the Z direction to the object being inspected can be compensated for, from the ram and base angle sensors 38, 40, 58, 60 and the measured Z axis position of the probe 22. A Z-axis compensation value may be determined from the cosine of the difference in angular measurements of the base and ram sensors, multiplied by the measured length of the ram 20 and probe 22. However, in practice this is usually not done, because the cosine of such small angles approaches the tolerances of commercially available angle sensors, and may not provide an accurate Z-axis compensation value.

As mentioned previously, the probe is positionable in many attitudes at the end of the ram, including horizontal. When the probe 22 is mounted in the $+Y$ or $-Y$ direction at the end of the ram 20, errors in the Z-X plane may be compensated for. This is shown in FIG. 8.

If the ram 20 has a component of tilt in the Y-direction, it will form an angle $\theta_{12}$ in the Y-direction measured from a normal (shown as dashed line 76) from the surface 6 of the base 4. In the example shown in FIG. 8, the probe is perpendicular to the ram 20. This means that a similar angle $\theta_{12}$ is formed between the probe 22 and an imaginary plane, shown as a dashed line 78 extending parallel to the base's surface 6 and through the end of the ram 20.

Figure 8:
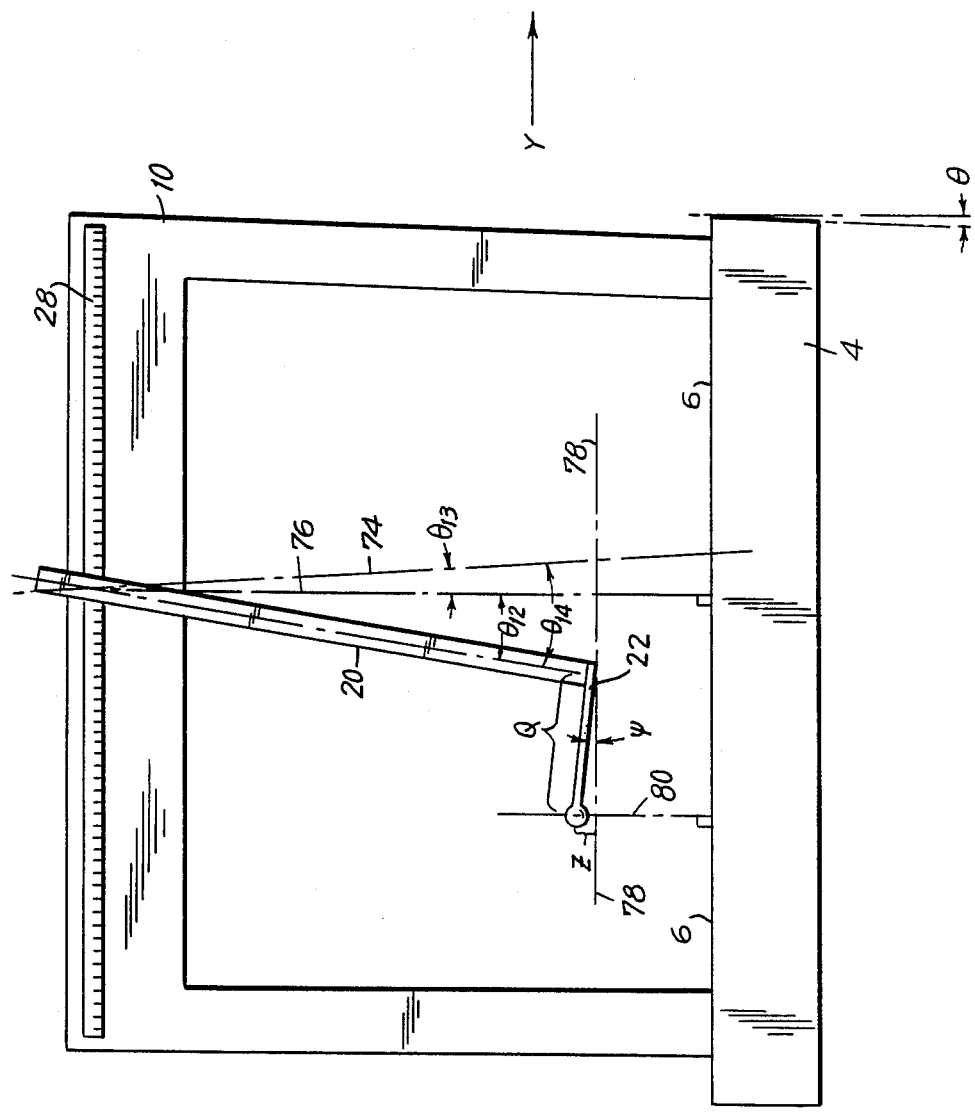
FIG. 8 is a diagrammatic representation of a portion of a bridge-type coordinate measuring machine, shown in front view.

Because $\theta_{12}$ is a small angle, the Z-axis error due to the tilt of the ram 20 relative to the base 4 can be approximated as the distance measured along a normal (shown as dashed line 80) to the base 4 that the tip of the probe 22 extends above the end of the ram 20, or distance Z shown FIG. 8.

One wishes to determine distance Z, which can be referred to as the Z axis compensation value. Analogous formuli to those shown as Equations 1–4 may be used, except that rather than using the length N which equals the combined length of the probe 22 and the length which the ram 20 extends to the object 8, the length, Q, of the probe 22, measured from the center of the ram 20 to the tip of the probe 22, should be used. The formula for calculating Z thus becomes:

$$Z = Q \times \sin \theta_{12} \quad \text{(Eq. 5)}$$

where
- $Z$ = the Z axis compensation value; and
- $\theta_{12}$ = the angle which the ram 22 tilts from a normal 76 to the base's surface 6.

Like Equation 1, Equation 5 may be approximated as follows:

$$Z = Q \times \theta_{12} \times 0.000005 \quad \text{(Eq. 6)}$$

where
$\theta_{12}$ is in arc seconds.

The angle $\theta_{12}$ may be measured by or derived from the Y angle sensor 40 on the ram 20.

However, the base 4 may be tilted in the Y-direction an angle of $\theta_{13}$ from vertical 74, which may throw off the measurement of the ram's Y angle sensor 40, which would measure as the angle of tilt $\theta_{14}$, equal to $\theta_{12}$ and $\theta_{13}$. Therefore, to calculate Z, the Z-axis compensation value, Equation 6 is modified, as follows:

$$Z = Q \times (\theta_{14} - \theta_{13}) \times 0.000005 \quad \text{(Eq. 7)}$$

Once calculated from the known value of the probe's length Q, and the angles $\theta_{14}$ and $\theta_{13}$ measured by the ram Y angle sensor 40 and the base Y angle sensor 60, respectively, the Z axis compensation value Z may be added to or substracted from the apparent Z axis positional measurement to compensate the same for the tilt of the ram 20 in the Y-direction.

The X-axis compensation for the X-axis position, with the probe 22 arranged as illustrated by FIG. 8, is performed in a manner analogous to the situation when compensation is performed in the X-Y plane. That is, Equation 4 is used, with P of Equation 4 being equal to just the length the ram 22 extends, as the probe 22 does not extend downwardly in the Z-direction.

In order to compensate for errors in the Z-Y plane, when the electronic probe 22 is mounted at the end of the ram 20 in the +X or −X attitude, the Y axis compensation for the Y axis position will be performed in the same manner as was discussed previously with respect to error compensation in the X-Y plane, except that P in Equation 4 is the distance which the ram 20 (and not the probe 22) extends. The Z axis compensation for the Z axis position will be calculated in the same manner as discussed above with respect to error compensation in the Z-X plane, using Equation 7, except that angular deviation data from the base X angle sensor 58 and ram X angle sensor 38 will be used.

It should be noted that compensation of the X-Y and Z positional data due only to the tilt of the ram 20 (with respect to the base 4) was described above, to simplify the explanation of the present invention. Compensation for the Abbe errors contributed by the Y-carriage 18 and traveling bridge 10 would be performed in a manner analogous to that disclosed herein. The same trignometric principles would apply. From each angle measurement of the X and Y sensors on each of the X and Y-carriages, the tilt of the base in the X and Y directions should be subtracted.

Again referring to the block diagram of FIG. 9, it can be seen that the compensated positional data is transferred to a part alignment unit 82. The part alignment unit 82 is used to mathematically align the machine to the part 8 being inspected and secured to the working surface of the base 4. The part alignment unit 82 eliminates the need to initially position the part 8 so that its major surfaces reside in the X-Y, X-Z and Y-Z planes. By touching each surface of the part 8 with the electronic probe 22, the machine will recognize where the part is physically located on the base 4. The part alignment unit 82 will transpose the compensated positional data, which was read by the transducers with reference to the machine axes, into data referenced to the part axes. Of course, if the machine operator aligns the part axes to the machine axes, the part alignment step need not be performed.

When the part alignment has been completed, a part location display 84 will indicate the location of the part 8 with respect to the X, Y and Z axes.

After the compensated positional data has been transposed to the part axes in the part alignment unit 82, the transposed data is provided to a calculation unit 86. Here, the actual dimensions of the part 8 are calculated.

The part dimensional data from the calculation unit 86 is provided to an output module 88, which is in effect an interface circuit that controls various display devices, such as a cathode ray tube display 90 or a printer 92.

Figure 10:
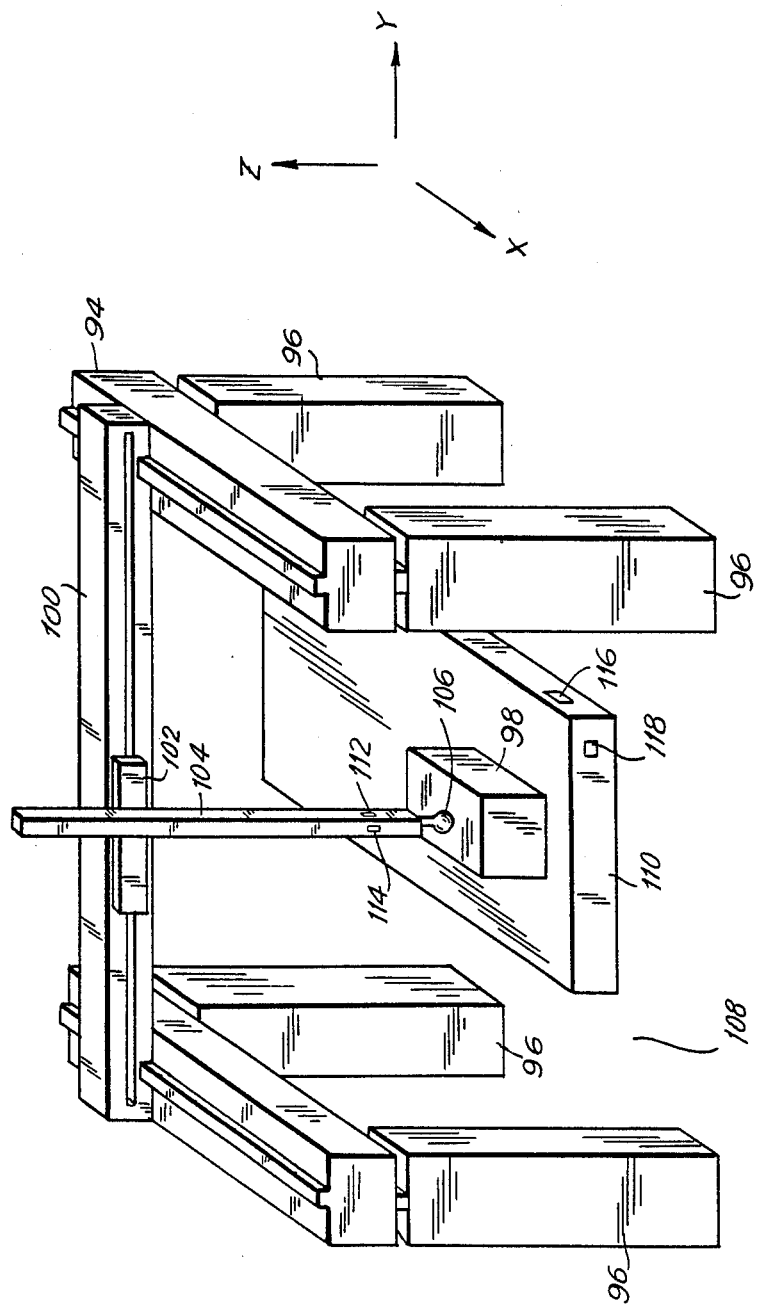
FIG. 10 is a diagrammatic representation of a gantry-type coordinate measuring machine.

The present system is adaptable to other types of coordinate measuring machines, including the gantry machine. The gantry machine is illustrated by FIG. 10 of the drawings.

As previously mentioned, the gantry machine is a much larger structure than the bridge-type machine, and is used to inspect large objects. The machine includes a rigid structure 94 that is supported usually from the floor by a number of vertical columns 96. A part 98 to be inspected is placed below this structure 94.

The structure of the gantry machine includes a movable X-carriage 100 and a movable Y-carriage 102, which performs similar functions as the X and Y-carriages of the bridge-type machine.

A ram 104 is suspended from the Y-carriage 102 and movable vertically thereon. Thus, the ram 104 is positionable in all three coordinate planes. Like the bridge-type machine, the ram 104 of the gantry machine includes a probe 106 which detects when contact is made with the inspected part 98. The part 98 may rest on the floor 108 or on a supporting platform 110 that rests on the floor.

The ram 104 of the gantry machine is outfitted with X and Y sensors 112, 114 respectively, in much the same way as the bridge-type machine previously described. In this way, the non-perpendicularity of the ram 104 with respect to the floor 108 or platform 110 can be determined. In such a case, the angularity measurements of the ram sensors 112, 114 would be directly used to calculate the compensation for the ram's position.

If, however, it is desirable to eliminate errors to the ram sensor readings due to vibrations or other changes to the floor's horizontality during part inspection that are transmitted to the ram 104, an X and Y sensor 116, 118 respectively, may be mounted to the floor 108 or to the supporting platform 110, if such is used. The calculations will then proceed in a manner similar to that described previously with regard to the bridge-type machine.

Also, if desired, X and Y sensors may be mounted to each of the X and Y carriages of the gantry machine to minimize the Abbe errors as much as possible.

The same principles of the present invention will apply equally as well to a horizontal ram configured coordinate measuring machine. Such a structure is diagrammatically illustrated by FIG. 11.

Figure 11:
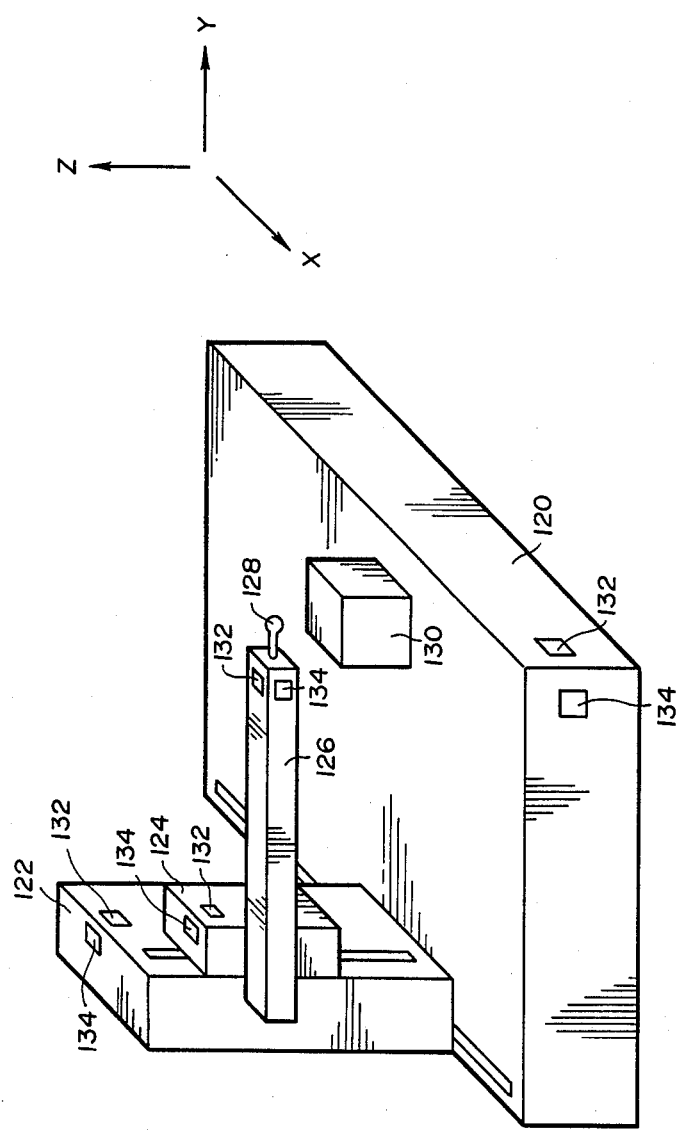
FIG. 11 is a diagrammatic representation of a horizontal ram configured coordinate measuring machine.

A horizontal ram configured machine, as shown in FIG. 11, includes a base 120 and an upright X-carriage 122 which is adapted to move in the X-direction along the base 120. A Z-carriage 124 is mounted to the X-carriage 122 and can move in the Z direction. Suspended from the Z-carriage 124 is a ram 126, which can move in the Y direction on the Z-carriage 124. The ram 126 includes a test probe 128 on its free end, which is used to probe and inspect a part 130 resting on the surface of the base 120. X and Y sensors 132, 134 respectively may be mounted on each of the base 120, X-carriage 122, Z-carriage 124 and ram 126, as well as positional transducers, such as graduated bars and optical readers.

Also, a measuring machine configured with a cantilevered ram supporting beam, which is more susceptible to Abbe errors than many other machines due to its particular design, may be provided with X and Y sensors on its component parts to correct for measurement errors caused by droop in the ram supporting structure, or non-linear component movement.

The method of actively compensating a coordinate measuring machine, and the design of an error compensated machine, in accordance with the present invention, will provide highly accurate dimensional data. Only limited memory need be allocated for the compensation step without the need to mass store previously measured data. The error compensated coordinate measuring machine will have the capability of immediately responding to any non-repeatable errors as well as errors due to the structural geometry changes of the machine.

The compensation process of the present invention is quite fast, as it immediately adjusts for positional errors with each incremental change in probe position. Also, the precalibration test and the requirement that calibration be completed off-line are eliminated, thus minimizing machine down time.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An error compensated, coordinate measuring machine, which comprises:
   a ram;
   a supporting structure for the ram, the ram being mounted to the structure and movable with respect thereto;
   an object sensing probe mounted to the ram;
   means for sensing the angular orientation of the ram relative to a reference plane, and for providing angularity data representative of the relative angular orientation of the ram, said means for sensing being capable of sensing angular orientation when said probe is stationary;
   means for measuring the position of the ram and for providing ram positional data; and
   means responsive to the angularity data for adjusting the ram positional data.

2. An error compensated, coordinate measuring machine as defined by claim 1, which further includes means for comparing a maximum angularity value with the angularity data of the sensing means.

3. An error compensated, coordinate measuring machine as defined by claim 1, which further includes means for storing the angularity data of the sensing means, the angularity data storing means being responsive to a signal from the object sensing probe.

4. An error compensated, coordinate measuring machine as defined by claim 1, which further includes means for storing the ram positional data, the ram data storing means being responsive to a signal from the object sensing probe.

5. An error compensated, coordinate measuring machine as defined by claim 1, wherein the means for sensing the angular deviation of the ram is mounted to the ram.

6. An error compensated, coordinate measuring machine as defined by claim 1, wherein the means for sensing the angular deviation of the ram includes an inclinometer.

7. A method of compensating for positional errors in a coordinate measuring machine, the coordinate measuring machine including a ram, a supporting structure for the ram and an object sensing probe mounted to the ram, the ram being mounted to the structure and movable with respect thereto, the method comprising the steps of:
   sensing the angular orientation of the ram relative to a reference plane and providing angularity data representative of the relative angular orientation of the ram;
   measuring the position of the ram and providing ram positional data; and
   adjusting the ram positional data in response to the angularity data.

8. A method of compensating for positional errors in a coordinate measuring machine as defined by claim 7, which includes the further step of storing the angularity data in response to a signal from the object sensing probe.

9. A method of compensating for positional errors in a coordinate measuring machine as defined by claim 7, which includes the further step of storing the ram positional data in response to a signal from the object sensing probe.

* * * * *